(12) United States Patent
Hazra et al.

(10) Patent No.: US 11,640,208 B2
(45) Date of Patent: May 2, 2023

(54) GESTURE FEEDBACK IN DISTRIBUTED NEURAL NETWORK SYSTEM

(71) Applicant: Infineon Technologies AG, Neubiberg (DE)

(72) Inventors: Souvik Hazra, Biot (FR); Ashutosh Baheti, Munich (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 763 days.

(21) Appl. No.: 16/691,021

(22) Filed: Nov. 21, 2019

(65) Prior Publication Data

US 2021/0158138 A1  May 27, 2021

(51) Int. Cl.
| | | |
|---|---|---|
| G06N 3/08 | (2006.01) | |
| G06N 3/04 | (2006.01) | |
| G01S 7/41 | (2006.01) | |
| G06K 9/62 | (2022.01) | |
| G06F 3/01 | (2006.01) | |
| G06V 40/20 | (2022.01) | |
| G06V 10/82 | (2022.01) | |

(52) U.S. Cl.
CPC ............ *G06N 3/08* (2013.01); *G01S 7/417* (2013.01); *G06F 3/017* (2013.01); *G06K 9/628* (2013.01); *G06N 3/0454* (2013.01); *G06V 10/82* (2022.01); *G06V 40/20* (2022.01); *G06V 40/28* (2022.01)

(58) Field of Classification Search
CPC ........ G06N 3/08; G06N 3/0454; G01S 7/417; G06F 3/017; G06K 9/628; G06V 40/28; G06V 10/82; G06V 40/20

USPC ........................................... 706/20
See application file for complete search history.

(56) References Cited

U.S. PATENT DOCUMENTS

| | | | |
|---|---|---|---|
| 9,336,268 B1 * | 5/2016 | Moudy | ............... G06N 3/0445 |
| 2014/0046922 A1 | 2/2014 | Crook et al. | |
| 2017/0091652 A1 | 3/2017 | Miao et al. | |

OTHER PUBLICATIONS

Chen et al., "Federated Meta-Learning for Recommendation," Huawei Noah's Ark Lab, Feb. 22, 2018, 9 pages.
McMahan et al., "Communication—Efficient Learning of Deep Networks from Decentralized Data," 20th International Conference on Artificial Intelligece and Statistics (AISTATS) 2017, Fort Lauderdale, Florida, USA, JMLR: W&CP vol. 54, 11 pages.
Verma et al., "An Algorithm for Model Fusion for Distributed Learning," Proc. of SPIE vol. 10635, 106350O, 8 pages.

(Continued)

*Primary Examiner* — Mark Roz
(74) *Attorney, Agent, or Firm* — Slater Matsil, LLP

(57) ABSTRACT

A method for operating a distributed neural network having a plurality of intelligent devices and a server includes: generating, by a first intelligent device of the plurality of intelligent devices, a first output using a first neural network model running on the first intelligent device and using a first input vector to the first neural network model; outputting, by the first intelligent device, the first output; receiving, by the first intelligent device, a gesture feedback on the first output from a user; determining, by the first intelligent device, a user rating of the first output from the gesture feedback; labeling, by the first intelligent device, the first input vector with a first label in accordance with the user rating; and training, by the first intelligent device, the first neural network model using the first input vector and the first label.

15 Claims, 7 Drawing Sheets

(56) References Cited

OTHER PUBLICATIONS

Zhao et al.,"Shielding Collaborative Learning: Mitigating Poisoning Attacks through Client-Side," Journal of Latex Class Files, vol. 14, No. 8, Aug. 2015, 12 pages.

Authors et al., "Radar-sensed reply gestures for messaging," IP.Com, IP.com No. IPCOM000256224D, IP. com Electronic Publication Date: Nov. 14, 2018, 6 pages.

Hazra et al., "Short-Range Radar-Based Gesture Recognition System Using 3D CNN With Triplet Loss," IEEE Acess, DOI: 10.1109/ACCESS.2019.2938725, vol. 7, 2019, pp. 125623-125633, Aug. 30, 2019, 11 pages.

Lien et al., "Soli: Ubiquitous Gesture Sensing with Millimeter Wave Radar," ACM Trans. Graph, vol. 35, No. 4, Article 142, Publication Date: Jul. 2016, DOI=10.114X 23978242925953, 19 pages.

\* cited by examiner

GESTURE FEEDBACK IN DISTRIBUTED NEURAL NETWORK SYSTEM

TECHNICAL FIELD

The present invention relates generally to a system and method for distributed neural network, and, in particular embodiments, to a system and method for distributed neural network having intelligent devices capable of receiving gesture feedback.

BACKGROUND

Gesture recognition has received much attention recently as a means for improved human-to-machine interface. Gestures can originate from any bodily motion or state but commonly originate from the face or hand. Current focuses in the field of gesture recognition include emotion recognition from face and hand gesture recognition. Users can use simple gestures to control or interact with devices without physically touching them. Many approaches have been made using cameras and computer vision algorithms to interpret sign language. However, the identification and recognition of posture, gait, proxemics, and human behaviors is also the subject of gesture recognition techniques. Gesture recognition can be seen as a way for computers to begin to understand human body language, thus building a richer bridge between machines and humans than primitive text user interfaces or even GUIs (graphical user interfaces), which still limit the majority of input to keyboard and mouse. Gesture recognition may allow humans to interact naturally with computers without any mechanical devices.

Neural networks models are parallel processing structures consisting of nonlinear processing elements or nodes interconnected by fixed or variable weights. A node sums n weighted inputs and passes the result through a nonlinear function. A node is characterized by the amount of an internal threshold, and by the type of nonlinearity used. More complex nodes may contain local memory, temporal integrators, or more complex mathematical operators. These topologies can be specified by differential equations that typically consist of memory decay terms, feedforward terms, and/or feedback terms and can be constructed to generate arbitrarily complex decision regions for stimulus-response pairs; hence they are well suited for use as detectors and classifiers.

SUMMARY

In accordance with a preferred embodiment of the present invention, a method for operating a distributed neural network having a plurality of intelligent devices and a server includes: generating, by a first intelligent device of the plurality of intelligent devices, a first output using a first neural network model running on the first intelligent device and using a first input vector to the first neural network model; outputting, by the first intelligent device, the first output; receiving, by the first intelligent device, a gesture feedback on the first output from a user; determining, by the first intelligent device, a user rating of the first output from the gesture feedback; labeling, by the first intelligent device, the first input vector with a first label in accordance with the user rating; and training, by the first intelligent device, the first neural network model using the first input vector and the first label.

In accordance with a preferred embodiment of the present invention, a method for operating a distributed neural network having a first intelligent device, a second intelligent device, and a server includes: receiving, by the first intelligent device and the second intelligent device, a global neural network model sent by the server, wherein the global neural network model has a first set of weights, wherein the global neural network model is used as a first neural network model for the first intelligent device and used as a second neural network model for the second intelligent device; displaying, by the first intelligent device and the second intelligent device, a first output and a second output, respectively, wherein the first output is computed by the first neural network model using a first input vector to the first neural network model, and the second output is computed by the second neural network model using a second input vector to the second neural network model; capturing, by the first intelligent device and the second intelligent device, a first gesture response to the first output from a first user and a second gesture response to the second output from a second user, respectively; labeling, by the first intelligent device and the second intelligent device, the first input vector and the second input vector with a first label and a second label, respectively, wherein the first label is based on a first user rating derived from the first gesture response, and the second label is based on a second user rating derived from the second gesture response; and training, by the first intelligent device and the second intelligent device, the first neural network model and the second neural network model, respectively, wherein training the first neural network model is performed using the first input vector and the first label, and training the second neural network model is performed using the second input vector and the second label, wherein training the first neural network model generates a first set of updated weights for the first neural network model, and training the second neural network model generates a second set of updated weights for the second neural network model.

In accordance with a preferred embodiment of the present invention, a distributed neural network includes: a first intelligent device comprising: a display device; a radar circuit comprising a plurality of radar antennas, wherein the radar circuit is configured to capture a user's gesture feedback on an output of the display device; and a controller unit coupled to the radar circuit, wherein a neural network model running on the controller unit generates the output of the display device using an input vector to the neural network model, wherein the neural network model has a set of weights, wherein the controller unit is configured to: determine a user rating for the output of the display device based on the user's gesture feedback; label the input vector based on the user rating; and train the neural network model using the labeled input vector to generate an updated set of weights.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

While gesture recognition has been the focus of many recent studies, there has not been much research in using gesture recognition in a distributed neural network. Combining distributed neural network with gesture feedback will enable new functionalities and new applications for distributed neural network.

The present invention will be described with respect to preferred embodiments in a specific context, a system and method for a distributed neural network system having intelligent devices capable of receiving hand gesture feedback. The invention may also be applied to distributed neural network systems having intelligent devices capable of receiving other types of gesture feedback, such as gesture feedback based on facial expressions or body postures. In addition, the invention may also be applied to distributed neural network systems that perform some forms of recognition given various forms of input (audio, visual, environmental, etc.).

In an embodiment of the present invention, a distributed neural network system includes a server and a plurality of intelligent devices. The server dispatches a global neural network model to the intelligent devices for use as the local neural network model running on each of the intelligent devices. Each intelligent device produces an output using the local neural network models and an input vector, and collects user's gesture feedback on the output. Based on the user gesture feedback, the intelligent device labels the input vector accordingly. After a pre-determined number of labeled input vectors are available, the local neural network model is trained using the labeled input vectors. After training the local neural network models, each intelligent device sends a weight difference vector to the server. The server calculates a weighted average of the weight difference vectors sent from all intelligent devices, and updates the global neural network model. The updated global neural network model is then dispatched to all intelligent devices for use as updated local neural network models.

Figure 1:
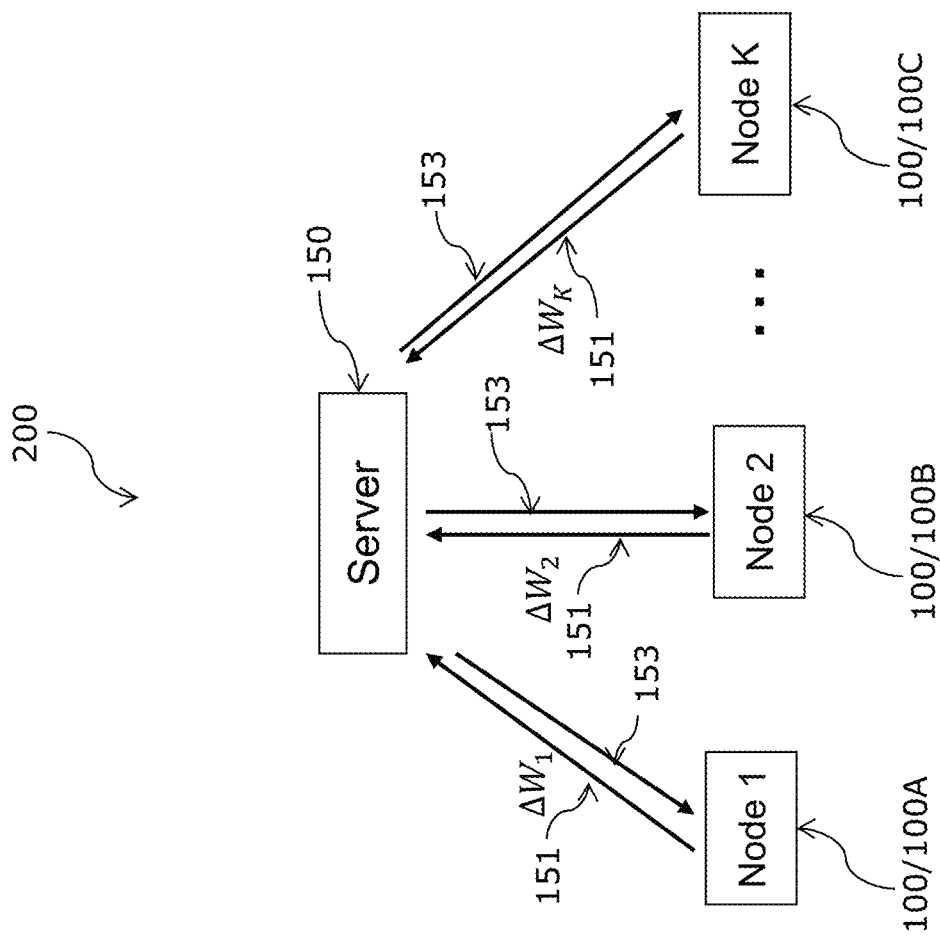
FIG. 1 illustrates a block diagram of a distributed neural network, in an embodiment.

FIG. 1 is a block diagram of a distributed neural network system 200 (also referred to as a distributed neural network), in an embodiment. In the example of FIG. 1, the distributed neural network system 200 includes a server 150 and a plurality of intelligent device 100 (e.g., 100A, 100B, 100C). The server 150 may also be referred to as a server node, and each of the intelligent devices 100 may also be referred to as an intelligent node, or a node. The server 150 communicates with each of the intelligent devices 100 through an uplink channel 151 and a downlink channel 153. The uplink channel 151 and the downlink channel 153 may be any suitable communication channels, such as wireless channels (e.g., radio frequency (RF) channels), wire-line channels (e.g., copper lines, co-axial cables, optical-fiber cables), or the like.

The server 150 may be, e.g., a computer. The server 150 maintains a neural network model that is able to provide an output vector based on an input vector. In some embodiments, a neural network, or a layer thereof, is often modeled as a matrix $W_{M \times N}$, and the relation between an input vector $X_N$ and an output vector $Y_M$ of the neural network (or a layer thereof) is often described as $Y_M = W_{M \times N} X_N$, where $X_N$ is an N×1 vector, $Y_M$ is an M×1 vector, and $W_{M \times N}$ is an M×N matrix. The matrix $W_{M \times N}$ may also be referred to as a set of weights (or a weight vector) of the neural network model. For ease of discussion, the matrix $W_{M \times N}$ may also be referred to as a weight vector W hereinafter.

In some embodiments, the neural network model maintained by the server 150 has an initial weight vector W. When the distributed neural network 200 is initialized (e.g., being set up for the first time, or after a reset), the neural network model maintained by the server 150 (with the initial weight vector W) is dispatched (e.g., distributed) through the downlink channels 153 to each of the intelligent devices 100.

Each intelligent device 100 includes a processor (e.g., a micro-controller) that runs a neural network model. After initialization, the dispatched neural network model with the initial weight vector W is used by each intelligent device 100 as the neural network model running on the intelligent device 100. For easy of discussion, the neural network model maintained by (e.g., saved on) the server 150 is referred to as a global neural network model, and the neural network model running on each intelligent device 100 is referred to as a local neural network model, or simply a neural network model.

For simplicity, operation of one of the intelligent devices (e.g., the intelligent device 100A) of the distributed neural network 200 and its interaction with the server 150 are described herein using two different example applications. Operations of other intelligent devices (e.g., 100B, 100C) of the distributed neural network 200 are similar to, but independent from, the intelligent device 100A. The two example applications include a dynamic pricing application for brick-and-motor retail stores and a voice recognition application.

As a first example, consider a dynamic pricing application for brick-and-mortar retail stores, where the intelligent device 100A determines the variable price VP of a dynamic price P for a product at a particular geographic location. Other intelligent devices (e.g., 100B, 100C) may be located in other stores at different geographic locations. In the example dynamic pricing application, the price P of a merchandize is a sum of a minimum base price PB and a variable price VP (e.g., P=PB+VP).

Figure 2:
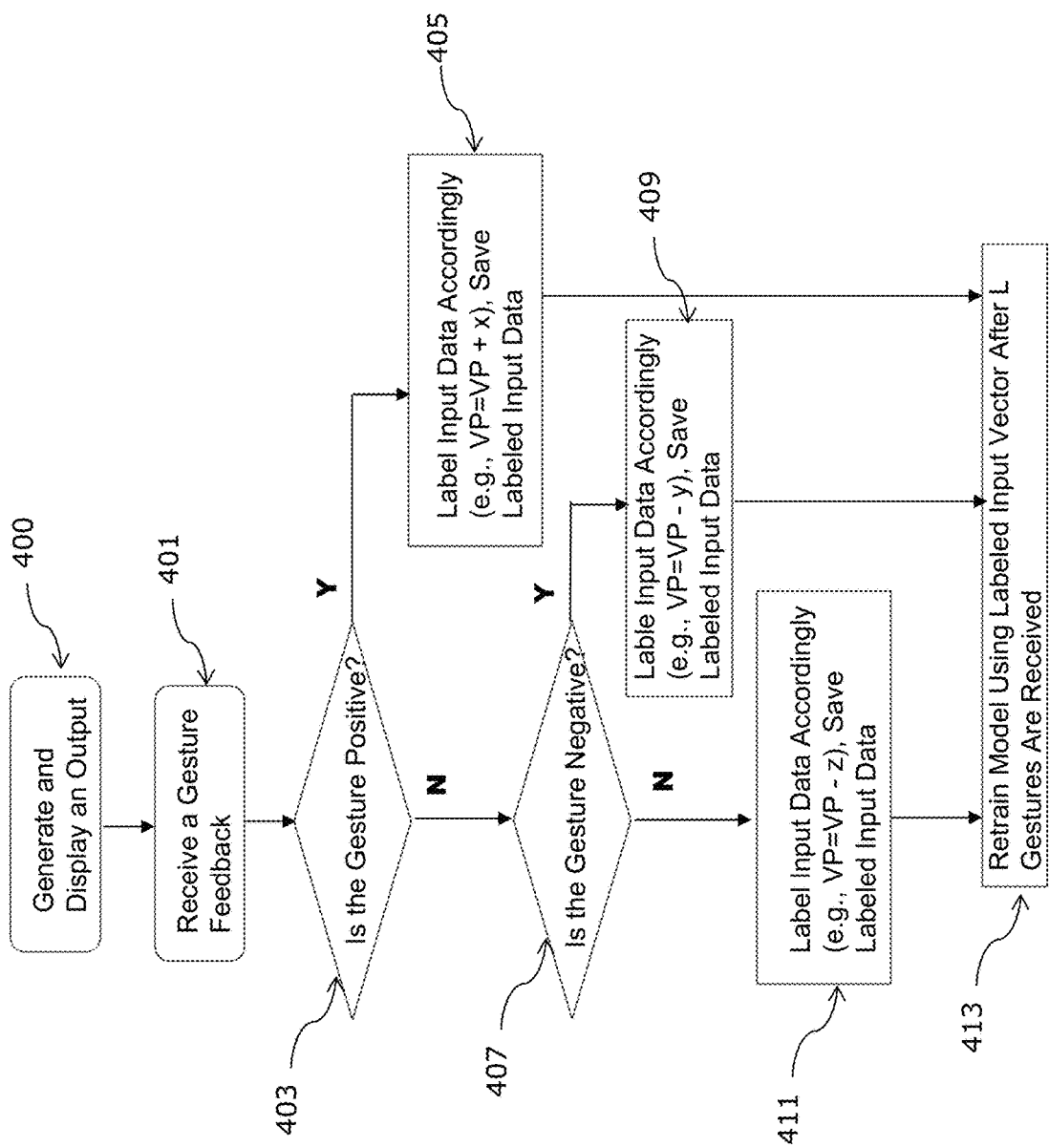
FIG. 2 illustrates a flow chart for operating an intelligent device of the distributed neural network of FIG. 1, in an embodiment.

Referring temporarily to FIG. 2, which illustrates an embodiment flow chart for operating the intelligent device (e.g., 100A) for the dynamic pricing application. In the illustrated embodiment of FIG. 2, at step 400, the local neural network model of the intelligent device 100A produces an output (e.g., a suggested variable price VP) based on an input vector to the local neural network model. The input vector to the local neural network model may be unique to the locations of the intelligent device 100A, and may include variables such as the city and/or the country in which the intelligent device 100A is located. The input vector may also include local purchasing power information, such as median house hold income or average personal income. Other relevant information, such as time of the day, or the season of the year, may also be included in the input vector. Furthermore, product specific information, such as the current temperature or forecasted temperature within a time period, may be included in the input vector, if the product is, e.g., an air conditioning product.

The price P, which is the sum of the minimum base PB and the suggested variable price VP generated by the local neural network model, is displayed on a display device, such as an electric price tag (e.g., a flat panel display, or an e-paper display). The intelligent device 100A may detect the presence of a user (e.g., a shopper looking at the price on the display device) and may prompt the user to give feedback (e.g., a user rating) on the displayed price. The prompts may be, e.g., a voice prompt or a message displayed on the display device. The user then gives his/her feedback through gesture. For example, the gesture may be a hand gesture, such as a "thumb-up" gesture (if the user is happy with the displayed price), a "thumb-down" gesture (if the user is unhappy with the displayed price), or a "thumb-sideways" gesture (if the user is neutral about the displayed price).

Next, at step 401, the intelligent device 100A captures the user gesture using, e.g., a radar circuit, such as a radar circuit 101 in embodiment intelligent device 100/100A, which is discussed below with reference to FIG. 4.

Next, at step 403, the gesture feedback from the user is recognized by a gesture recognition system (e.g., a neural network model for recognizing hand gestures) running on the intelligent device 100A. In an embodiment, the gesture recognition system recognizes the user's gesture (e.g., hand gesture), and assigns a user rating for each recognized gesture. For example, the "thumb-up" hand gesture is assigned a positive user rating, the "thumb-down" hand gesture is assigned a negative user rating, and the "thumb-sideways" hand gesture is assigned a neutral user rating. An example flow chart for the processing of a gesture recognition system is discussed below with reference to FIG. 5.

Depending on the user rating derived from the gesture feedback, the intelligent device 100 labels the input vector accordingly. In particular, at step 405, when the gesture feedback is positive (e.g., a positive user rating), the current input vector is labeled with a label of "VP+x," where VP is the current output (e.g., the variable price VP) of the local neural network model, and x is a non-negative number ($x \geq 0$). The labeled input vector is saved and used for training the local neural network model later. One skilled in the art will appreciate that in the context of neural network training, the label of the labeled input vector indicates a target output for the neural network model, and training the neural network model with the labeled input vector will train (e.g., update) the weight vector of the neural network model, such that the neural network model is more likely to generate the target output given the same or similar input vector. Therefore, a positive user rating may allow the variable price VP of the merchandize to be adjusted upwards (if $x > 0$) or remain the same (if $x = 0$), after the labeled input vector is used to train the neural network model.

The step 409 shows the labeling of the input vector when the gesture feedback is negative (e.g., a negative user rating). In particular, the current input vector is labeled with a label of "VP−y," where VP is the current output (e.g., the variable price VP) of the neural network model, and y is a positive number smaller than VP (e.g., $0 < y < VP$). In some embodiments, if VP−y becomes a negative number, the intelligent device 100A forces (e.g., sets) the label to be zero for the current input vector, which may ensure that the variable price VP is a non-negative number. The labeled input vector is saved and used for training the neural network model later. Therefore, a negative user rating may allow the variable price VP of the merchandize to be adjusted downward, after the labeled input vector is used to train the neural network model.

Similarly, if the gesture feedback is neutral (e.g., a neutral user rating) (see step 411), the current input vector is labeled with a label of "VP−z," where VP is the current output (e.g., the variable price VP) of the neural network model, z is a positive number smaller than y (e.g., $0 < z < y < VP$). In some embodiments, if VP−z becomes a negative number, the intelligent device 100A forces (e.g., sets) the label to be zero for the current input vector, which may ensure that the variable price VP is a non-negative number. The labeled input vector is saved and used for training the neural network model later. Therefore, a neutral user rating may allow the variable price VP of the merchandize to be adjusted downward by an amount of z (which is less than the adjustment amount y corresponding to a negative user rating), after the labeled input vector is used to train the neural network model.

Next, at step 413, after a pre-determined number (e.g., L) of gesture feedbacks are received, the L labeled input vectors corresponding to the L received gesture feedbacks are used to train the local neural network model running on the intelligent device 100A. Since the original neural network model may be obtained through training, the training of the neural network model at step 413 may also be referred to as retraining of the neural network model. After the training is finished, an updated weight vector for the local neural network model is obtained and used by the local neural network model for generating subsequent output.

Referring back to FIG. 1, as discussed above, the local neural network model on each intelligent device 100 operates independently from the neural network models on other intelligent devices 100. For example, the intelligence device 100A may produce a first output based on a first input vector to its local neural network model, and the intelligence device 100B may produce a second output based on a second input vector to its local neural network model. Since the first input vector and the second input vector may be different, the first output and the second output may be different. In addition, after the local neural network model on each intelligent device 100 is updated (e.g., through a training process) using its own labeled input vectors, the weight vector W for each intelligent device 100 may be different, due to its unique training data (e.g., the labeled input vectors).

In some embodiments, each intelligent device 100 calculates a weight difference vector $\Delta W$ between the updated weight vector and the weight vector used before the training. The weight difference vector $\Delta W$ is then sent back to the server 150, e.g., through the uplink channel 151. The weight difference vectors from different intelligent devices 100 are denoted as $\Delta W_1, \Delta W_2, \ldots,$ and $\Delta W_k$, where K is the number of intelligent devices 100 in the distributed neural network 200. Each intelligent device 100 may calculate and send a weight difference vector $\Delta W$ to the server 150 after each training process, or may calculate and send a weight difference vector ΔW to the server 150 after a pre-determined period of time.

The server 150 receives the weight difference vectors from all the intelligent devices 100 and calculates a weight average $\overline{\Delta W}$ of the weight difference vectors, e.g., using the following equation:

$$\overline{\Delta W} = \sum_{k=1}^{K} \frac{n_k}{n} \Delta W_k,$$

where n is a constant, and $n_k$ is the weight factor for the k-th weight difference vector $\Delta W_k$. In some embodiments, the server 150 assigns larger weight factors for weight difference vectors sent from intelligent devices 100 receiving more negative user ratings. For example, each intelligent device 100 may send the server 150, in addition to the weight difference vector, an indication of the number of negative user ratings received for the L labeled input vectors used for updating (e.g., training) the local neural network model. The server 150 may, based on the number of negative user ratings received, assign different weight factors $n_k$ for at least some of the intelligent devices 100.

After the weight average $\overline{\Delta W}$ is calculated, the server 150 updates the global neural network model. For example, the weight vector for the global neural network model may be updated by adding the weight average $\overline{\Delta W}$ to the weight vector previously stored. In addition, the updated global neural network model is then dispatched (e.g., sent) to all intelligent devices too and used as the local neural network model by the intelligent devices 100. In some embodiments, dispatching the updated global neural network model is performed by dispatching the updated weight vector of the updated global neural network model to all the intelligent devices 100.

The intelligent devices 100 may then generate output, receive user gesture feedback, update (train) the local neural network models with labeled input vectors, and send back weight difference vectors to the server 150 again. The server 150 then calculate the weighted average of the weight difference vectors and dispatch the updated global neural network model to the intelligent devices 100 again. The above described processes may repeat multiple iterations to refine the neural network model through repeated training.

The operation of one of the intelligent devices (e.g., 100A) is described herein using a second example application. Other intelligent devices (e.g., 100B, 100C) in the distributed neural network 200 operate similarly to, but independent from, the intelligent device 100A. In the second example application, the server 150 maintains a global neural network model for voice recognition. The global neural network model is dispatched to the intelligent devices 100 at initialization. Each of the intelligent device 100 may be, e.g., an infortainment system in a car, a smart speaker, or a smart phone.

Figure 3:
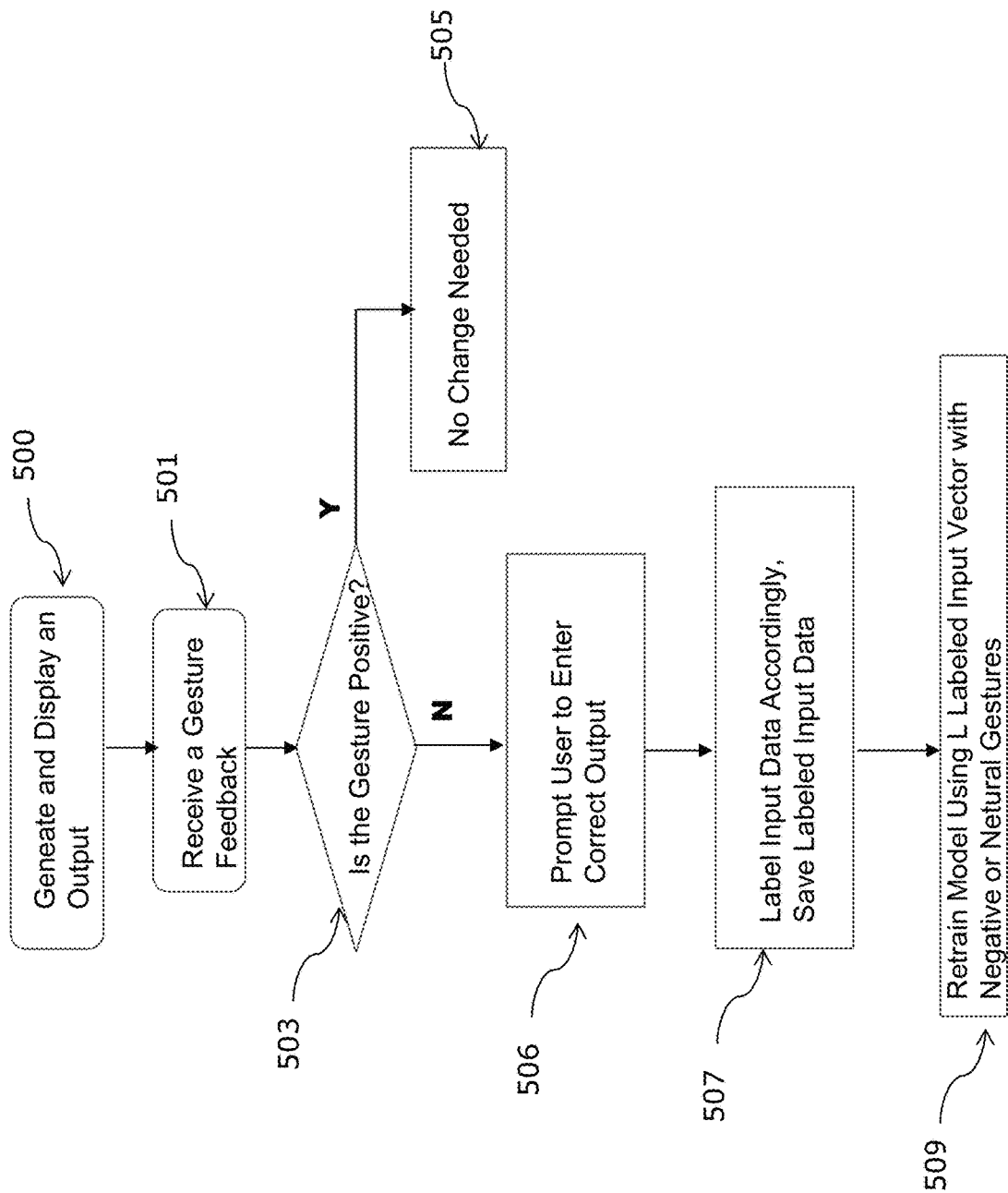
FIG. 3 illustrates a flow chart for operating an intelligent device of the distributed neural network of FIG. 1, in another embodiment.

Referring to FIG. 3, which illustrates a flow chart of a method for operating an intelligent device (e.g., 100A) for voice recognition in the distributed neural network 200, in an embodiment. At step 500, the local neural network model (e.g., a voice recognition system) of the intelligent device 100A, based on an input vector (e.g., a user's voice input), generates an output, which may be a string of words (e.g., a predicted voice command from the user) that correspond to the user's voice input. The output of the voice recognition system is then displayed, e.g., as texts on a display device.

Next, at step 501, the intelligent device 100A prompts the user for a feedback on the output of the voice recognition system. At step 503, the user's gesture feedback (e.g., hand gestures) is captured and recognized by the intelligent device 100A. Based on the user's gesture feedback, a user rating (e.g., a positive user rating, a negative user rating, or a neutral user rating) is assigned, and the intelligent device 100A labels the input vector accordingly. In particular, as illustrated in the processing step of 505, when the user rating is positive (e.g., the voice recognition result is accurate or satisfying for the user), there is no need to update the local neural network model, thus the input vector is not saved. On the other hand, when the user rating is negative or neutral (e.g., the voice recognition results is not accurate or not satisfying for the user), the intelligent device 100A prompts the user to enter the correct (e.g., expected) output, as illustrated in the processing step 506. For example, a few options may be displayed on the display device, and the user may choose one of the options as the expected output, or may directly enter the expected output, e.g., using touch screen of the display device. In some embodiments, when the user chooses or enters the expected output, a confidence level for the user's choice of expected output is computed using the current neural network model. For example, the neural network model may produce (e.g., calculate) a probability distribution of all the classes, and the probability of the expected output class may be used as the confidence level for the expected output class. In an embodiment where the neural network is distance metric based, the distance from other date points of the same class may be used as a confidence metric (e.g., closer distance means higher confidence level). If the confidence level for the user's choice of expected output is below a pre-determined threshold value, the user's choice of expected output is deemed unreliable, and the current input vector is not used (e.g., discarded) for training the local neural network model.

Next, at step 507, the intelligent device 100A labels the input vector with the correct output the user chooses, and saves the labeled input vector for training the local neural network model later. As discussed above, unreliable choice of correct output by the user is ignored and not saved for training the local neural network model. After a pre-determined number (e.g., L) of labeled input vector with negative or neutral user ratings are saved, the L labeled input vectors are used to train the local neural network model, as illustrated in the processing step of 509. As a result of the training, a new weight vector for the local neural network model is generated.

Next, the intelligent device 100A calculates the weight difference vector ΔW, and send it to the server 150. The server 150, after receiving the weight difference vectors from all of the intelligent devices 100, calculates a weighted average $\overline{\Delta W}$ and updates the global neural network model. The updated global neural network model is then dispatched to all the intelligent devices 100 and used as the local neural network models. Processing is the same as or similar to that discussed above for the dynamic pricing example, thus details are not repeated here.

Modifications to the disclosed embodiments are possible and are fully intended to be included in the scope of the present disclosure. For example, while hand gestures are used as examples of user gesture feedback, other gestures, such as facial expressions, body postures/gestures, may also be used as the user gesture feedback. The various types of gestures (e.g., facial expression, hand gesture, body posture/gesture) may be combined to improve the likelihood that the intelligent device 100 correctly identifies the gesture feedback. For example, the intelligent device 100 may capture the various types of gestures and recognizes each type of gesture, and assign a user rating based on the recognized gestures from all types of gestures captured. In addition, the intelligent device 100 may detect and eliminate false or unreliable user feedback, e.g., if the user rating based on the facial expression does not match the user rating based on the hand gesture. Furthermore, the user rating is not limited to "positive," "negative," and "neutral," and additional user rating with more granularity may be possible. For example, the user may use 1 to 5 fingers to indicate a user rating from 1 to 5. As yet another example, the user's gesture feedback may be gathered without being prompted. For example, the intelligent device 100 may capture the user's gestures while the user is looking at the display device without prompting the user for feedback, and may determine the user's buying interest based on the recognized user gestures.

Figure 4:
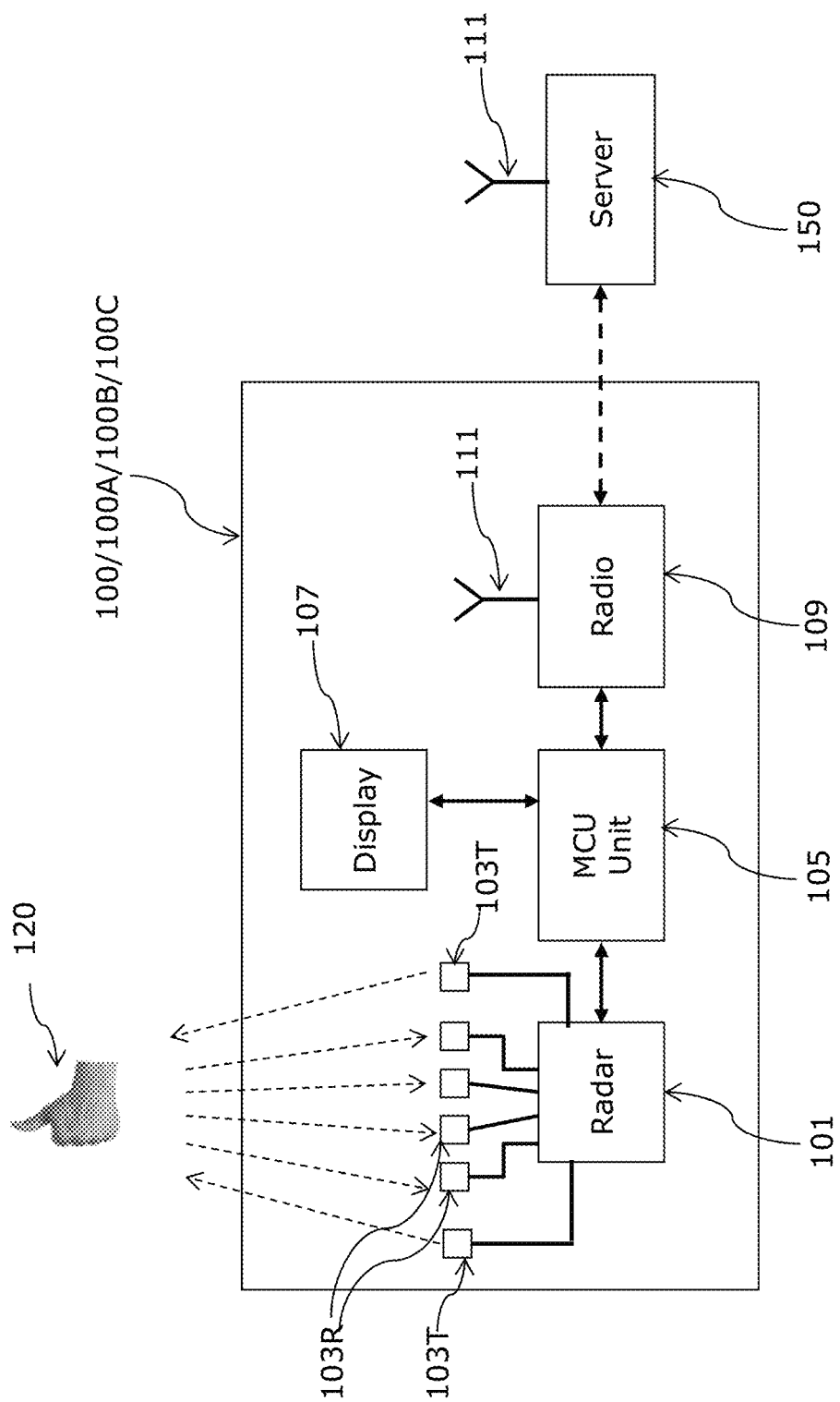
FIG. 4 illustrates a block diagram of an intelligent device of the distributed neural network of FIG. 1, in an embodiment.

FIG. 4 is a block diagram of the intelligent device 100 (e.g., 100A, 100B, or 100C) of the distributed neural network 200, in an embodiment. As illustrated in FIG. 4, the intelligent device 100 includes a radar circuit 101, a micro-controller unit 105, a display device 107, and a communication circuit 109. To illustrate the interaction of the intelligent device 100 with other elements of the distributed neural network 200, FIG. 4 also illustrates a hand gesture of a user 120 (e.g., a human user), and the server 150. The user 120 and the server 150 are not considered part of the intelligent device 100 in the illustrated example.

The radar circuit 101 includes transmit antennas 103T and receive antennas 103R. The transmit antennas 103T sends out electromagnetic signals, such as radio frequency (RF) signals, and/or infrared (IR) signals. The receive antennas 103R receive the reflected electromagnetic signals from the user 120. The transmit antennas 103T and the receive antennas 103R may operate in a multi-input multi-output (MIMO) configuration. The radar circuit 101 includes additional hardware, such as signal conditioning circuits, analog-to-digital converters (ADCs), and the like, and coverts the received signals at the receive antennas 103R into digital data.

In some embodiments, the radar sensors of the radar circuit 101 also record the time-of-flight (TOF) information (e.g., distance information), therefore the radar circuit 101 provides a three-dimensional (3D) image of the field-of-view (FOV). In the illustrated embodiment, the radar circuit 101 further includes signal pre-processing circuits that processes the raw ADC output data and produces an output (e.g., an image representation of the raw ADC data, such as a Range-Doppler map) suitable for subsequent gesture recognition processing.

The micro-controller unit 105 includes a processor, a memory unit (e.g., a non-volatile memory unit), and other functional modules. The local neural network model is stored in the memory unit and runs on the micro-controller unit 105. Besides running the local neural network model, the micro-controller unit 105 also implements other control and/or communication functions, such as the functions illustrated in FIGS. 2 and 3. For example, the micro-controller unit 105 may have another neural network model for gesture recognition running on it, details of which are discussed below with reference to FIG. 5.

The display device 107 is coupled to the micro-controller unit 105 and displays the output of the intelligent device 100. The display device 107 may be, e.g., a flat-panel monitor, an e-paper display, or the like. The communication circuit 109 includes circuits for supporting communication between the intelligent device 100 and the server 150. In the example of FIG. 4, the communication circuit 109 includes an antenna 111 for communicating wirelessly with the server 150. Instead of, or in addition to, wireless communication, the communication circuit 109 may communicate with the server 150 through wire-line communication, as indicated by the dashed line between the communication circuit 109 and the server 150.

Figure 5:
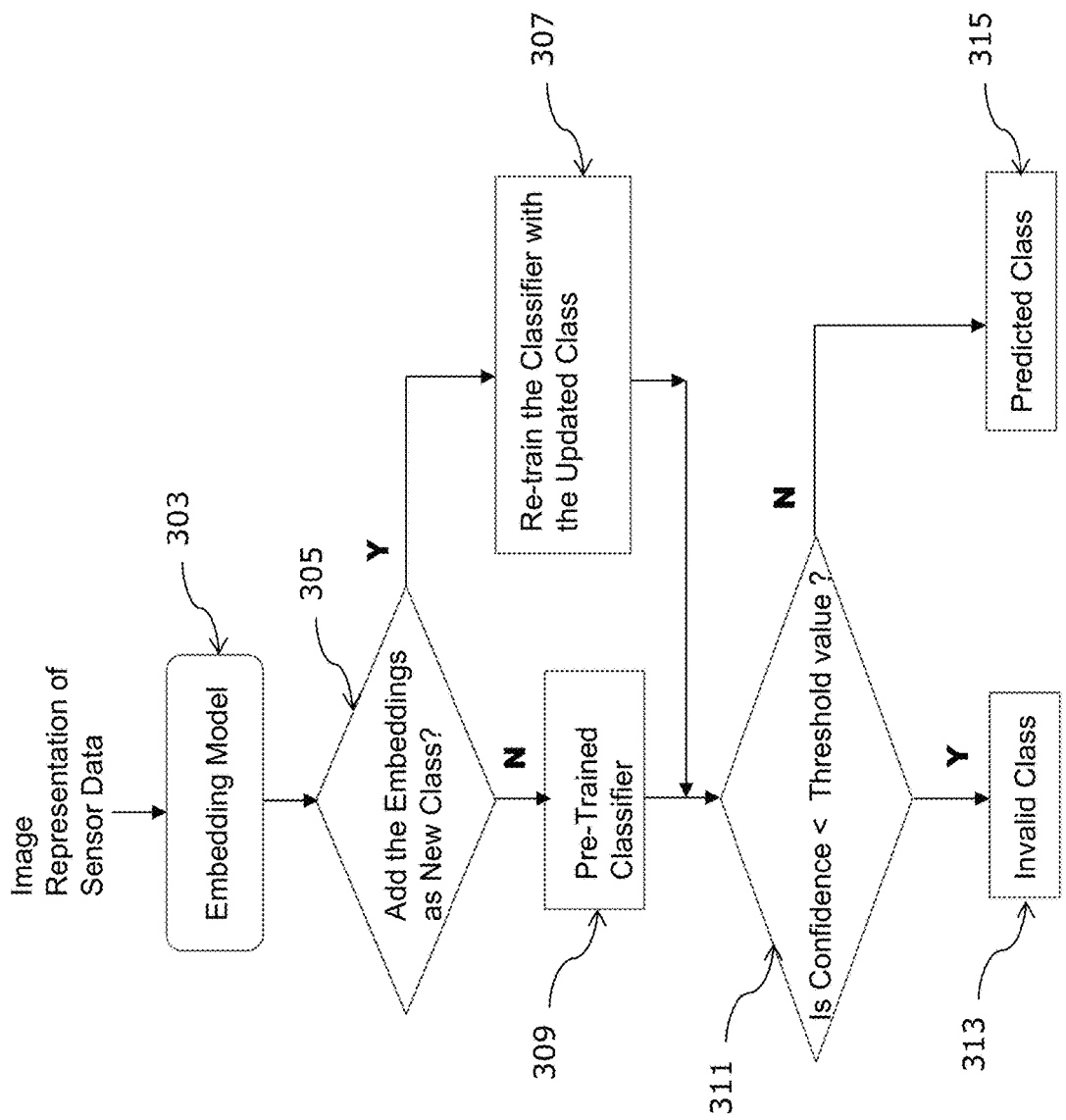
FIG. 5 is a flow chart showing the processing of a gesture recognition system, in an embodiment.

FIG. 5 is a flow chart showing the processing of a gesture recognition system, in an embodiment. The gesture recognition system of FIG. 5 may be implemented as a gesture recognition neural network that runs on the intelligent device 100.

Referring to FIG. 5, at step 303, an image representation of the radar sensor data, such as a Range-Doppler image or a 2D Spectrogram generated by the radar circuit 101 (see FIG. 4), is sent to an embedding model. The embedding model may be, e.g., a neural network model trained with distance-based triplet-loss metric. In some embodiments, the output of the embedding model is a one-dimensional (1D) vector with a pre-determined size (e.g., number of elements in the 1D vector). Next, at step 305, depending on whether or not the intelligent device too (or the server 150) decides to add the current output of the embedding model as a new class, the processing proceeds to step 307 or step 309. In particular, if no new class is to be added, the 1D vector at the output of the embedding model is sent to a pre-trained classifier. In some embodiments, the pre-trained classifier is a K-nearest neighbor (K-NN) classifier, which calculates distance metrics between the 1D vector and a plurality of vectors corresponding to a plurality of known classes (e.g., a plurality of known hand gestures), and the known class with the smallest distance metric is chosen as the output of the classifier. In other words, the 1D vector from the output of the embedding tool is classified (e.g., identified) as a known class having the smallest distance metric from the 1D vector. If the output of the embedding tool is to be added as a new class, the classifier is updated (e.g., a new class added) and retrained with the updated class.

Next, at step 311, the gesture recognition system calculates a confidence metric of the identified class. In some embodiments, the confidence metric is calculated as a distance between a centroid of the identified class to a centroid of the 1D vector, in which case a large distance indicates a lower confidence level. The gesture recognition system then compares the confidence level with a pre-determined threshold. If the confidence level is lower than a pre-determined threshold value, the identified class is declared invalid (e.g., the hand gesture is not recognized), as illustrated in the processing step 313. If the confidence level is higher than or equal to the pre-determined threshold value, then the identified class (e.g., a known hand gesture) is outputted as the output of the gesture recognition system, as illustrated by the processing step 315. The processing illustrated in FIG. 5 is merely a non-limiting example. Other gesture recognition algorithms are also possible and are fully intended to be included within the scope of the present disclosure.

Figure 6:
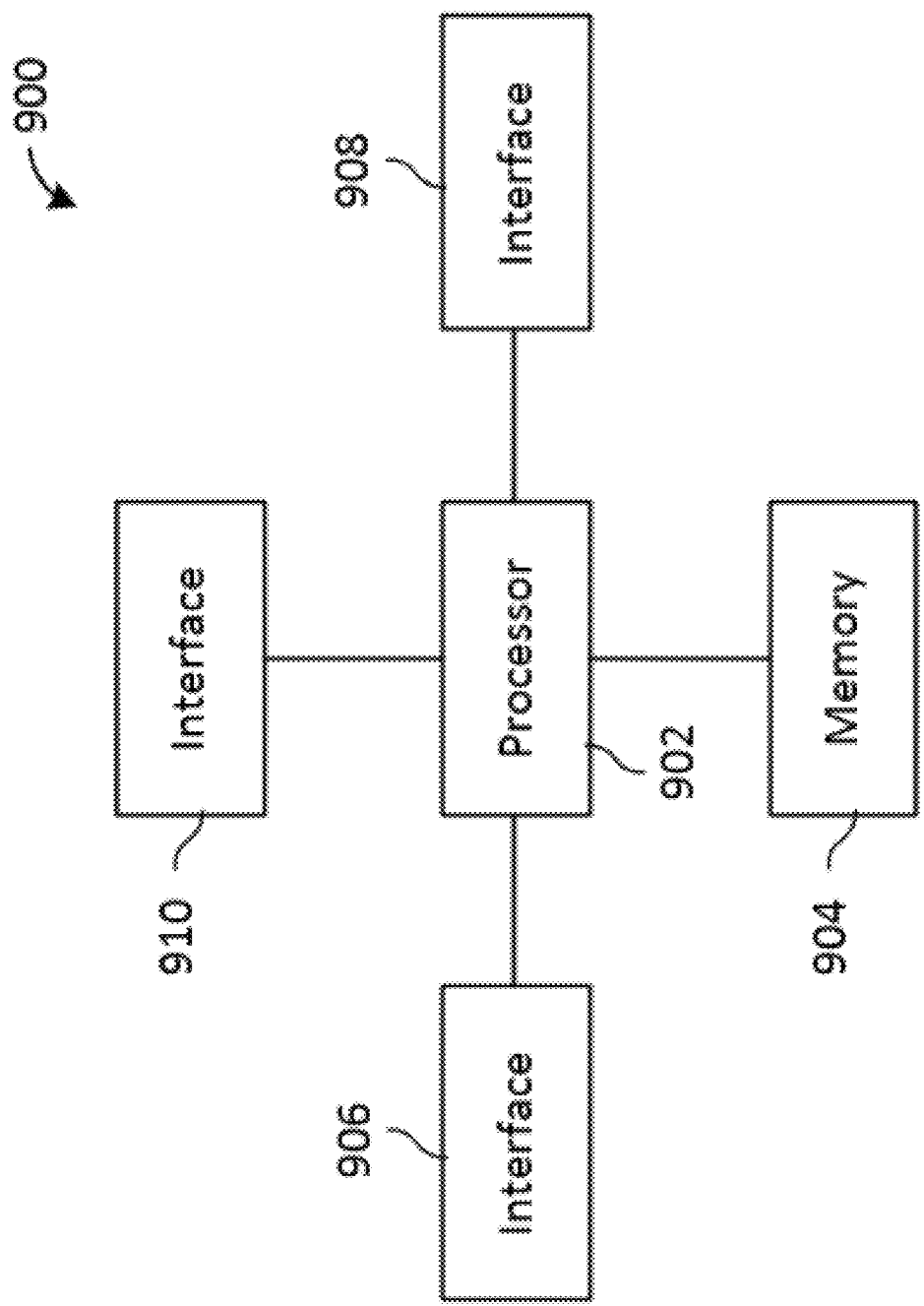
FIG. 6 is a block diagram of a processing system, in an embodiment.

FIG. 6 is a block diagram of an embodiment processing system 900, which may be used as the micro-controller unit 105 of the intelligent device 100, or used as the server 150. As shown, the processing system 900 includes a processor 902, a memory 904, and interfaces 906, 908, and 910, which may (or may not) be arranged as shown in FIG. 6. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components. The processing system 900 may include additional components not depicted in FIG. 6, such as long term storage (e.g., hard drive, non-volatile memory, etc.).

Figure 7:
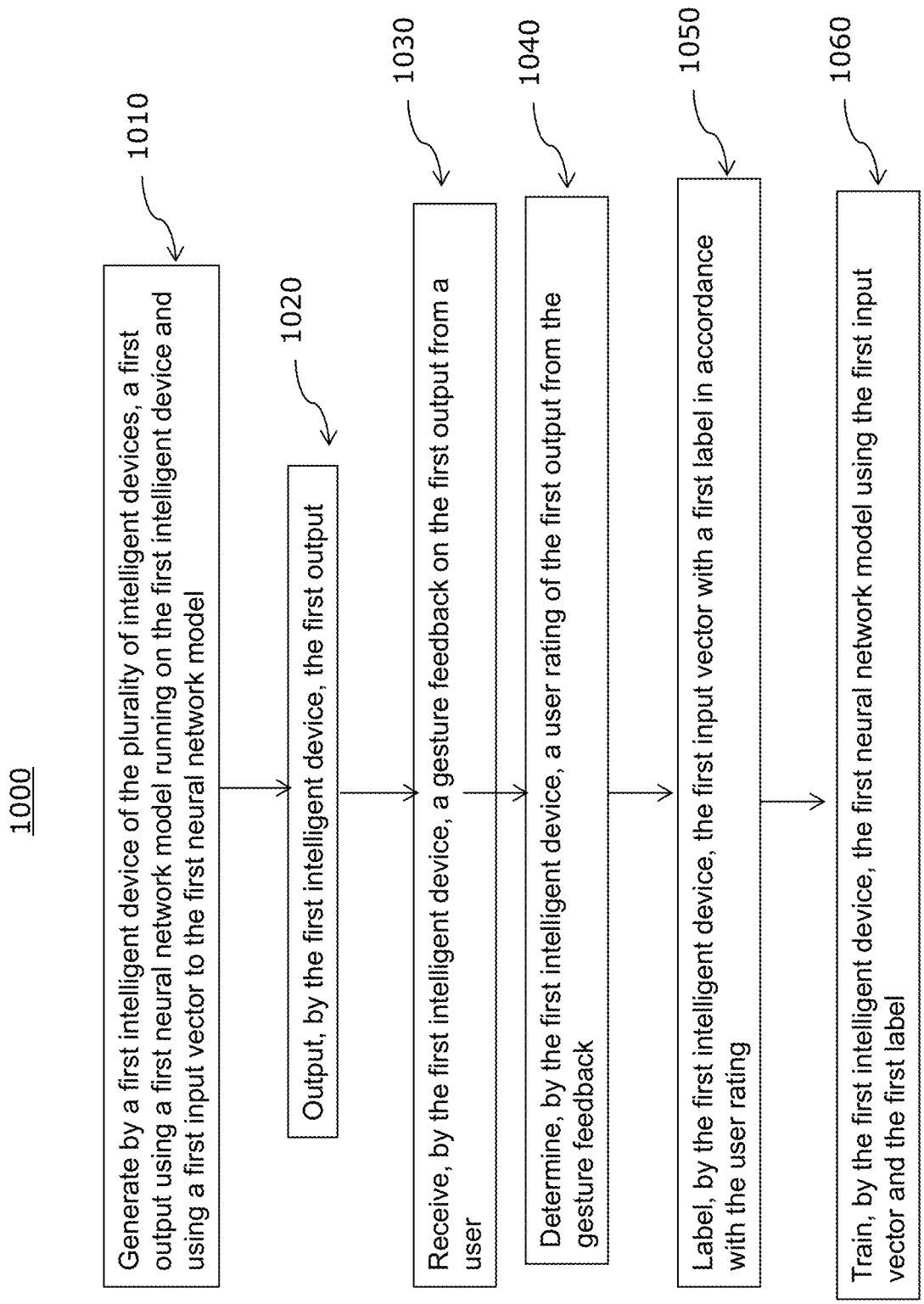
FIG. 7 is a flow chart of a method for operating a distributed neural network that comprises a plurality of intelligent devices and a server, in an embodiment.

FIG. 7 is a flow chart of a method 1000 for operating a distributed neural network that comprises a plurality of intelligent devices and a server, in an embodiment. It should be understood that the embodiment method shown in FIG. 7 is merely an example of many possible embodiment methods. One of ordinary skill in the art would recognize many variations, alternatives, and modifications. For example, various steps as illustrated in FIG. 7 may be added, removed, replaced, rearranged, or repeated.

Referring to FIG. 7, at step 1010, a first output is generated by a first intelligent device of the plurality of intelligent devices using a first neural network model running on the first intelligent device and using a first input vector to the first neural network model. At step 1020, the first output is outputted by the first intelligent device. At step 1030, a gesture feedback on the first output is received from a user by the first intelligent device. At step 1040, a user rating of the first output is determined from the gesture feedback by the first intelligent device. At step 1050, the first input vector is labeled with a first label in accordance with the user rating by the first intelligent device. At step 1060, the first neural network model is trained using the first input vector and the first label by the first intelligent device.

Disclosed embodiments achieve advantages. By using gesture recognition system, the user feedback could be easily gathered, even without user being prompted. Previously, dynamic pricing may only be possible for on-line shopping systems, with the user's browsing history collected through on-line tools. With the intelligent device 100 capable of receiving user gesture feedback, dynamic pricing becomes possible even for brick-and-motor retail stores. Gesture recognition may offer improved privacy, since gesture recognition recognizes the gesture, but not the user's identity. Gesture recognition using 3D radar data may also overcome problems faced by vision based systems, such as self-occlusion.

In addition, by running the local neural network model on each intelligent device 100 independently, the neural network model can be customized for each individual location. For example, the price of the merchandize may be customized for a particular market. The updating (e.g., training) of the local neural network model is performed after a predetermined number of labeled input vectors are available, this prevents the output of the neural network model from being affected abruptly by a single gesture feedback. By calculating the weighted average of all weight difference vectors, contributions from all the intelligent devices 100 in the distributed neural network are shared by all the intelligent devices 100 (by dispatching the updated global neural network model to all intelligent devices).

Furthermore, since each intelligent device 100 is only sending back the weight difference vector to the server 150, the data traffic on the uplink is greatly reduced, which lowers the requirements and cost for hardware supporting the communication. Another benefit is security, since if the weight difference vector is intercepted by an un-authorized party, without knowing the original weight vector, the weight difference vector itself may be meaningless.

Example embodiments of the present invention are summarized here. Other embodiments can also be understood from the entirety of the specification and the claims filed herein.

Example 1. In an embodiment, a method for operating a distributed neural network having a plurality of intelligent devices and a server includes: generating, by a first intelligent device of the plurality of intelligent devices, a first output using a first neural network model running on the first intelligent device and using a first input vector to the first neural network model; outputting, by the first intelligent device, the first output; receiving, by the first intelligent device, a gesture feedback on the first output from a user; determining, by the first intelligent device, a user rating of the first output from the gesture feedback; labeling, by the first intelligent device, the first input vector with a first label in accordance with the user rating; and training, by the first intelligent device, the first neural network model using the first input vector and the first label.

Example 2. The method of Example 1, further comprising, before generating the first output by the first intelligent device: receiving, by the plurality of intelligent devices, a global neural network model with a first set of coefficients sent by the server, the global neural network model with the first set of coefficients becoming the respective neural network model running on each of the plurality of intelligent devices initially.

Example 3. The method of Example 2, wherein training the first neural network model generates a first set of updated coefficients for the first neural network model, wherein the method further comprises: producing, by the first intelligent device, a first difference vector by computing a difference between the first set of updated coefficients and the first set of coefficients; and sending, by the first intelligent device, the first difference vector to the server.

Example 4. The method of Example 3, further comprising, after sending the first difference vector to the server: receiving, by the first intelligent device, an updated set of coefficients from the server for the first neural network model, wherein the updated set of coefficients is computed by the server using the first difference vector and other difference vectors sent from other intelligent devices of the plurality of intelligent devices, wherein the other intelligent devices operate similarly to, yet independently from, the first intelligent device.

Example 5. The method of Example 4, wherein the updated set of coefficients is a sum of the first set of coefficients and a weighted average of the first difference vector and the other difference vectors.

Example 6. The method of Example 5, wherein the user rating comprises a positive rating, a negative rating, or a neutral rating, wherein difference vectors computed by intelligent devices with more negative ratings are assigned more weight when computing the weighted average.

Example 7. The method of Example 1, wherein outputting, by the first intelligent device, the first output comprises: outputting, by the first intelligent device, the first output on a first display device.

Example 8. The method of Example 7, wherein receiving, by the first intelligent device, the gesture feedback comprises: prompting, by the first intelligent device, the user for a feedback on the first output; and capturing, by the first intelligent device, a gesture of the user using radar sensors of the first intelligent device.

Example 9. The method of Example 8, wherein determining, by the first intelligent device, the user rating comprises: classifying, by the first intelligent device, the gesture of the user into one of a plurality of pre-determined gestures; and returning, by the first intelligent device, the user rating associated with the gesture classified by the first intelligent device.

Example 10. The method of Example 9, wherein the user rating comprises a positive rating, a negative rating, and a neutral rating.

Example 11. The method of Example 10, wherein the first output of the first neural network model is a value VP, wherein labeling, by the first intelligent device, the first input vector with the first label comprises: in response to a positive rating from the gesture feedback, labeling the first input vector with a label of VP+x; in response to a negative rating from the gesture feedback, labeling the first input vector with a label of VP−y; and in response to a neutral rating from the gesture feedback, labeling the first input vector with a label of VP−z, where x, y, and z are positive numbers, and y>z.

Example 12. The method of Example 10, wherein labeling, by the first intelligent device, the first input vector with the first label comprises: in response to a negative rating or a neutral rating from the gesture feedback, prompting, by the first intelligent device, the user to enter a correct output for the first neural network model; and labeling, by the first intelligent device, the first input vector with the correct output as the first label.

Example 13. The method of Example 12, wherein training, by the first intelligent device, the first neural network model comprises: training the first neural network model using only the first input vector and the first label collected when the user rating is negative or neutral.

Example 14. In an embodiment, a method for operating a distributed neural network having a first intelligent device, a second intelligent device, and a server includes: receiving, by the first intelligent device and the second intelligent device, a global neural network model sent by the server, wherein the global neural network model has a first set of weights, wherein the global neural network model is used as a first neural network model for the first intelligent device and used as a second neural network model for the second intelligent device; displaying, by the first intelligent device and the second intelligent device, a first output and a second output, respectively, wherein the first output is computed by the first neural network model using a first input vector to the first neural network model, and the second output is computed by the second neural network model using a second input vector to the second neural network model; capturing, by the first intelligent device and the second intelligent device, a first gesture response to the first output from a first user and a second gesture response to the second output from a second user, respectively; labeling, by the first intelligent device and the second intelligent device, the first input vector and the second input vector with a first label and a second label, respectively, wherein the first label is based on a first user rating derived from the first gesture response, and the second label is based on a second user rating derived from the second gesture response; and training, by the first intelligent device and the second intelligent device, the first neural network model and the second neural network model, respectively, wherein training the first neural network model is performed using the first input vector and the first label, and training the second neural network model is performed using the second input vector and the second label, wherein training the first neural network model generates a first set of updated weights for the first neural network model, and training the second neural network model generates a second set of updated weights for the second neural network model.

Example 15. The method of Example 14, further comprising: sending, by the first intelligent device and the second intelligent device, a first weight difference and a second weight difference, respectively, to the server, wherein the first weight difference is a difference between the first set of weights and the first set of updated weights, and the second weight difference is a difference between the first set of weights and the second set of updated weights.

Example 16. The method of Example 15, further comprising: receiving, by the first intelligent device and the second intelligent device, an updated first set of weights from the server, wherein the updated first set of weights is a sum of the first set of weights and a weighted average, the weight average being a weighted average of the first weight difference and the second weight difference.

Example 17. The method of Example 14, wherein training the first neural network model is performed using the first input vector and the first label only when the first user rating is negative or neutral, and wherein the first input vector and the first label are not used for training the first neural network model when the first user rating is positive.

Example 18. The method of Example 17, wherein training the second neural network model is performed using the second input vector and the second label only when the second user rating is negative or neutral, and wherein the second input vector and the second label are not used for training the second neural network model when the second user rating is positive.

Example 19. In an embodiment, a distributed neural network includes: a first intelligent device comprising: a display device; a radar circuit comprising a plurality of radar antennas, wherein the radar circuit is configured to capture a user's gesture feedback on an output of the display device; and a controller unit coupled to the radar circuit, wherein a neural network model running on the controller unit generates the output of the display device using an input vector to the neural network model, wherein the neural network model has a set of weights, wherein the controller unit is configured to: determine a user rating for the output of the display device based on the user's gesture feedback; label the input vector based on the user rating; and train the neural network model using the labeled input vector to generate an updated set of weights.

Example 20. The distributed neural network of Example 19, further comprising a server, wherein the controller unit is further configured to: calculate a difference vector between the updated set of weights and the set of weights; and send the difference vector to the server.

Example 21. The distributed neural network of Example 20, wherein the server is configured to: compute a weighted average using the difference vector from the first intelligence device and other difference vectors from other intelligent devices of the distributed neural network; generate a set of global weights; and send the set of global weights to the first intelligent device and the other intelligent devices for use as a respective set of weights for a respective neural network model running on the first intelligent device and the other intelligent devices.

Example 22. The distributed neural network of Example 19, wherein the first intelligent device further comprises a communication circuit configured to support at least a wireless or a wire-line communication channel.

Example 23. The distributed neural network of Example 19, wherein the user rating comprises a positive rating, a negative rating, or a neutral rating, wherein the controller unit is configured to train the neural network model using the labeled input vector only when the user rating is a negative rating or a neutral rating.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a distributed neural network that comprises a plurality of intelligent devices and a server, the method comprising:
receiving, by the plurality of intelligent devices, a global neural network model with a first set of coefficients sent by the server, the global neural network model with the first set of coefficients becoming the respective neural network model running on each of the plurality of intelligent devices initially;
generating, by a first intelligent device of the plurality of intelligent devices, a first output using a first neural network model running on the first intelligent device and using a first input vector to the first neural network model;
outputting, by the first intelligent device, the first output;
receiving, by the first intelligent device, a gesture feedback on the first output from a user;
determining, by the first intelligent device, a user rating of the first output from the gesture feedback;
labeling, by the first intelligent device, the first input vector with a first label in accordance with the user rating;
training, by the first intelligent device, the first neural network model using the first input vector and the first label;
wherein training the first neural network model generates a first set of updated coefficients for the first neural network model,
wherein the method further comprises:
producing, by the first intelligent device, a first difference vector by computing a difference between the first set of updated coefficients and the first set of coefficients; and
sending, by the first intelligent device, the first difference vector to the server.

2. The method of claim 1, further comprising, after sending the first difference vector to the server:
receiving, by the first intelligent device, an updated set of coefficients from the server for the first neural network model, wherein the updated set of coefficients is computed by the server using the first difference vector and other difference vectors sent from other intelligent devices of the plurality of intelligent devices, wherein the other intelligent devices operate similarly to, yet independently from, the first intelligent device.

3. The method of claim 2, wherein the updated set of coefficients is a sum of the first set of coefficients and a weighted average of the first difference vector and the other difference vectors.

4. The method of claim 3, wherein the user rating comprises a positive rating, a negative rating, or a neutral rating, wherein difference vectors computed by intelligent devices with more negative ratings are assigned more weight when computing the weighted average.

5. The method of claim 1, wherein outputting, by the first intelligent device, the first output comprises:
outputting, by the first intelligent device, the first output on a first display device.

6. The method of claim 5, wherein receiving, by the first intelligent device, the gesture feedback comprises:
prompting, by the first intelligent device, the user for a feedback on the first output; and
capturing, by the first intelligent device, a gesture of the user using radar sensors of the first intelligent device.

7. The method of claim 6, wherein determining, by the first intelligent device, the user rating comprises:
classifying, by the first intelligent device, the gesture of the user into one of a plurality of pre-determined gestures; and
returning, by the first intelligent device, the user rating associated with the gesture classified by the first intelligent device.

8. The method of claim 7, wherein the user rating comprises a positive rating, a negative rating, and a neutral rating.

9. The method of claim 8, wherein the first output of the first neural network model is a value VP, wherein labeling, by the first intelligent device, the first input vector with the first label comprises:
in response to a positive rating from the gesture feedback, labeling the first input vector with a label of VP+x;
in response to a negative rating from the gesture feedback, labeling the first input vector with a label of VP−y; and
in response to a neutral rating from the gesture feedback, labeling the first input vector with a label of VP−z, where x, y, and z are positive numbers, and y>z.

10. The method of claim 8, wherein labeling, by the first intelligent device, the first input vector with the first label comprises:
in response to a negative rating or a neutral rating from the gesture feedback, prompting, by the first intelligent device, the user to enter a correct output for the first neural network model; and
labeling, by the first intelligent device, the first input vector with the correct output as the first label.

11. The method of claim 10, wherein training, by the first intelligent device, the first neural network model comprises:
training the first neural network model using only the first input vector and the first label collected when the user rating is negative or neutral.

12. A method for operating a distributed neural network that comprises a first intelligent device, a second intelligent device, and a server, the method comprising:
receiving, by the first intelligent device and the second intelligent device, a global neural network model sent by the server, wherein the global neural network model has a first set of weights, wherein the global neural network model is used as a first neural network model for the first intelligent device and used as a second neural network model for the second intelligent device;
displaying, by the first intelligent device and the second intelligent device, a first output and a second output, respectively, wherein the first output is computed by the first neural network model using a first input vector to the first neural network model, and the second output is computed by the second neural network model using a second input vector to the second neural network model;
capturing, by the first intelligent device and the second intelligent device, a first gesture response to the first output from a first user and a second gesture response to the second output from a second user, respectively;

labeling, by the first intelligent device and the second intelligent device, the first input vector and the second input vector with a first label and a second label, respectively, wherein the first label is based on a first user rating derived from the first gesture response, and the second label is based on a second user rating derived from the second gesture response; and training, by the first intelligent device and the second intelligent device, the first neural network model and the second neural network model, respectively, wherein training the first neural network model is performed using the first input vector and the first label, and training the second neural network model is performed using the second input vector and the second label, wherein training the first neural network model generates a first set of updated weights for the first neural network model, and training the second neural network model generates a second set of updated weights for the second neural network model; and sending, by the first intelligent device and the second intelligent device, a first weight difference and a second weight difference, respectively, to the server, wherein the first weight difference is a difference between the first set of weights and the first set of updated weights, and the second weight difference is a difference between the first set of weights and the second set of updated weights.

13. The method of claim 12, further comprising:

receiving, by the first intelligent device and the second intelligent device, an updated first set of weights from the server, wherein the updated first set of weights is a sum of the first set of weights and a weighted average, the weight average being a weighted average of the first weight difference and the second weight difference.

14. The method of claim 12, wherein training the first neural network model is performed using the first input vector and the first label only when the first user rating is negative or neutral, and wherein the first input vector and the first label are not used for training the first neural network model when the first user rating is positive.

15. The method of claim 14, wherein training the second neural network model is performed using the second input vector and the second label only when the second user rating is negative or neutral, and wherein the second input vector and the second label are not used for training the second neural network model when the second user rating is positive.

* * * * *